US007058017B2

(12) United States Patent
Lee et al.

(10) Patent No.: US 7,058,017 B2
(45) Date of Patent: Jun. 6, 2006

(54) METHOD FOR GUARANTEEING SEAMLESS QUALITY OF SERVICE IN WIRELESS INTERNET

(75) Inventors: Kyoung Hee Lee, Mungyeong-si (KR); Yu Sik Hahm, Donghae-si (KR); Myung Chul Kim, Daejeon (KR)

(73) Assignees: Information and Communications University Educational Foundation, Seoul (KR); Winsroad, Inc., Seoul (KR)

( * ) Notice: Subject to any disclaimer, the term of this patent is extended or adjusted under 35 U.S.C. 154(b) by 1004 days.

(21) Appl. No.: 09/931,292

(22) Filed: Aug. 17, 2001

(65) Prior Publication Data

US 2002/0024941 A1 Feb. 28, 2002

(30) Foreign Application Priority Data

Aug. 31, 2000 (KR) ............................... 2000-51382

(51) Int. Cl.
*H04J 1/16* (2006.01)
(52) U.S. Cl. .................... 370/238; 370/331; 370/395.2
(58) Field of Classification Search ................ 370/329, 370/331–334, 338, 390, 397, 409; 455/436–439, 455/442–444
See application file for complete search history.

(56) References Cited

U.S. PATENT DOCUMENTS 5,590,126 A * 12/1996 Mishra et al. .............. 370/329

OTHER PUBLICATIONS

Kyounghee Lee, "A Method of Concatenation and Optimization for Resource Reservation Path (CORP)", Team Project Proposal—Ice 715 Mobile Computing, Online!, Mar. 29, 2000 pp. 1-5.
R. Barden, Ed., L. Zhang, S. Berson, S. Herzog and S. Jamin, "Resource ReSerVation Protocol (RSVP)—Version 1 Functional Specification", Sep. 1997, pp. 1-31.
Indu Mahadevan and Krishna M. Sivalingnam, "An Experimental Architecture for providing QoS guarantees in Mobile Networks using RSVP", Personal, Indoor and Mobile radio Communications, 1998 IEEE, Sep. 8, 1998, pp. 50-54.

* cited by examiner

*Primary Examiner*—Huy D. Vu
*Assistant Examiner*—Daniel Ryman
(74) *Attorney, Agent, or Firm*—H.C. Park & Associates, PLC

(57) ABSTRACT

In wireless Internet, a resource reservation path is established between a CH and a MH through an initial BS located in an initial cell where the MH is currently located. Pseudo reservation paths (PRPs) are established between the initial BS and its neighboring BSs, one PRP being established between the current BS and each of the neighboring BSs. Once the MH moves into one of the neighboring cells of the initial cell, a PRP established for a neighbor BS is activated. The activated PRP is concatenated with the established resource reservation path through the initial BS and the neighbor BS, thereby establishing an optimized resource reservation path.

14 Claims, 5 Drawing Sheets

METHOD FOR GUARANTEEING SEAMLESS QUALITY OF SERVICE IN WIRELESS INTERNET

FIELD OF THE INVENTION

The present invention relates to a method for guaranteeing the quality of service in wireless Internet; and, more particularly, to a method for guaranteeing the seamless quality of service in wireless Internet by concatenating and optimizing a resource reservation path.

DESCRIPTION OF THE PRIOR ART

Internet tends to deliver more and more traffic types requiring different Qualities of Services (QoS), e.g., transfer rate, delay and jitter. In particular, support for real-time services is needed since delivering time-sensitive multimedia contents is getting popular. In order to satisfy these requirements, several transport mechanisms have been proposed for QoS guarantees including Real-Time Protocol (RTP), Resource Reservation Setup Protocol (RSVP) (see R. Branden et al., "Resource ReSerVation Protocol (RSVP)—Version 1 Functional Specification", RFC 2205, IETF, September 1997) and Differentiated Service (Diffserv).

However, most existing works on QoS guarantees for the Internet have not considered the mobile computing environment. There are certain constraints in wireless networks that make QoS guarantees difficult. These constraints can be classified into two categories: poor communication environment and mobility problems. The communication environment in wireless networks is characterized by low bandwidth, high error rate, low processing power of mobile devices and changing surroundings (such as a car passing by). The mobility problem is concerned with maintaining a traffic path when the Mobile Host (MH) and possibly its Access Point (AP) move around geographically.

In wireless networks based on Mobile IP (Internet Protocol), the MH's movement may necessitate changing its own IP address which is used to identify the MH's physical location. In the Resource Reservation Setup Protocol (RSVP), a path is first established for traffic transport and QoS is guaranteed by reserving resources along the path. If RSVP is used in mobile Internet, the change of MH's location may make the reserved path useless and a new path has to be established. This overhead results in inefficient use of network resources and also there exists a time gap for establishing the new reservation path. That is, the handoff process for Mobile IP incurs a nontrivial delay. This is a major problem in applying RSVP to mobile Internet.

A number of approaches have been proposed to solve the above problem and they focus on reducing the overhead and delay caused by handoffs. However, they require updating a significant number of network components and/or only support local mobility within a restricted region.

In the Bay Area Research Wireless Access Network (BARWAN) project carried out in the University of California at Berkeley (see, e.g., "Bay Area Research Wireless Access Network", http://cs.berkeley.edu/randy/Daedalus/BARWAN), a mechanism is proposed using multicast to reduce delays caused by handoffs by the MHs. All packets destined to a MH are delivered to the current cell where the MH is located and its neighboring cells by using multicast to support a soft handoff. Header multicasting, a method that multicasts only packet headers to the neighboring cells to reduce network resources consumption, is also proposed. This mechanism trades off network resources for smoother handoffs.

Talukdar has proposed the Mobile RSVP (MRSVP) where RSVP is extended to work on wireless networks (see A. K. Talukdar et al., "MRSVP: A Reservation Protocol for an Integrated Service Packet Network with Mobile Hosts", Tech. report TR-337, Rutgers University; and A. K. Talukder et al., "On Accommodating Mobile Hosts in an Integrated Services Packet Network", in Proc. IEEE Conference on Computer Communications (INFOCON), April 1997). The major feature of MRSVP is passive reservation. This special RSVP session is pre-established to prepare for the MH's possible movement and no data is passed on it until activated. In passive reservation, each MH must maintain a mobility specification that includes information on all locations where a MH is expected to visit during the lifetime of a connection. Also MRSVP requires a special host, proxy agent, which makes active/passive reservations along the paths from the locations in the mobility specification of a sender to the locations in the mobility specification of a receiver on behalf of the MH.

In the current cell of a MH participating in a RSVP session, a local proxy agent acts as a normal router and passes traffic along an active reservation path. However, in the neighboring cells, remote proxy agents join the MH's RSVP session with passive reservations. If handoff occurs, a remote proxy agent in the new cell becomes a local proxy agent and maintains a reservation path by activating the pre-established passive reservation instead of establishing a new RSVP session. Thus, the delay in establishing a new RSVP session can be reduced. The major drawback is that the intermediate routers along the reservation paths must manage all state information in the passive reservations. If passive reservations are made to all the neighboring cells, the overhead of maintaining state information can be several times higher than that for an active reservation. Since the major limitation in scalability of RSVP comes from state explosion at the intermediate routers, this mechanism will add the overhead. Also the architecture requires all routers to support passive reservation. Thus, the passive reservation functions must be added to all routers in the network. In addition, a MH is required to have prior knowledge of its mobility.

Chen et al. have disclosed a similar method to MRSVP, which employs a predictive reservation and temporary reservation scheme (see W. Chen and L. Huang, "RSVP Mobility Support: A Signaling Protocol for Integrated Services Internet with Mobile Hosts", in Proc. IEEE Conference on Computer Communications (INFOCOM), Part vol. 3, pp. 1283–1292 Vol 3, 2000). With this mechanism, a MH makes a predictive resource reservation in advance at the locations where it may visit during the lifetime of the connection. These locations become the leaves of a multicast tree and the mobility of a host is modeled as transitions in the multicast group membership. To make a more efficient use of wireless resources, temporary reservations can temporarily use the inactive bandwidth reserved by the predictive reservations. Simulation results are used to show the performance improvement over the approach of RSVP tunnel extension combined with mobile IP.

Mahadevan et al. have proposed a new network architecture that requires fewer passive reservation-capable routers than MRSVP (see I. Mahadevan et al., "An Architecture for QoS Guarantees and Routing in Wireless/Mobile Networks", ACM International Workshop on Wireless Mobile Multimedia (WOWMOM '98), pp. 11–20, 1998; and I.

Mahadevan et al., "Architecture and Experimental Results for Quality of Service in Mobile Networks using RSVP and CBQ", ACM Wireless Networks 6, pp. 221–234, July 2000). The main feature of the method is to use a RSVP path extension to guarantee QoS in mobile Internet. In the architecture, a mobile access point (AP) with intelligence, i.e., BS (base station), is located in each wireless cell. A set of administratively grouped cells is defined as a QoS domain. If a MH participates in a RSVP session, passive reservations between current BS and each BS in the neighboring cells within the same QoS domain are established. In the case that a neighboring cell resides in a different QoS domain, a passive reservation is established between a gateway router and the neighboring BS instead. If a MH moves within a single QoS domain, the passive reservation between the current BS and the previous BS is activated and traffic is delivered along the activated passive reservation. If a MH moves from a QoS domain to another domain, a passive reservation between the current BS and a gateway router is activated and traffic is delivered therealong. Therefore, only BSs and gateway routers are required to have passive reservation capability in this architecture, and a MH needs not participate in making passive reservations. To enable this process, each BS must have the capability of a normal router and, at the same time, must be able to perform a passive reservation as a proxy agent in MRSVP. Each BS must also maintain information on all the BSs in the neighboring cells.

Mahadevan's approach removes some of the major limitations of MRSVP, but there are still certain drawbacks. Under this mechanism, a reservation path may be extended continuously if a MH keeps moving within a QoS domain. Also, every gateway router needs to be able to do passive reservations. In practice, most routers also act as gateways for their own subnet. So the approach still requires a significant number of network components to be changed. Also there is no way to maintain and extend an existing RSVP session when a MH moves between two different routing domains.

Dommety et al. have proposed a route optimization mechanism in mobile ATM networks (see G. Dommety et al., "Route Optimization in Mobile ATM Networks", ACM Mobile Networks and Applications Journal (MONET), Vol. 3, Issue 2, pp. 203–220, August 1998). The scheme optimizes a sub-optimal connection. The path for a connection is considered as sub-optimal if it is not the shortest path between the two endpoints of the connection. Most fast handoff schemes for mobile ATM networks, including path extension and anchor switch, reduce handoff latency by avoiding establishing a new connection along the shortest path when the MH has moved. In other words, only a necessary portion of the path supporting the MH's movement is established and attached to the existing connection. This may result in a sub-optimal connection between two endpoints. Dommety has devised a route optimization mechanism to find a sub-path in the shortest path which is not included in the current sub-optimal path, and generates an optimized connection. Since ATM networks are connection-oriented, Dommety's approach can in principle be applied to optimize the extended reservation path in Mahadevan's architecture. However, Dommety's approach is based on the Private Network-to-Network Interface (PNNI) protocol and mobile ATM networks. Therefore, it needs to be modified to work on packet-switching networks using Mobile IP.

SUMMARY OF THE INVENTION

It is, therefore, a primary object of the present invention to provide a method for concatenating and optimizing Resource Reservation Path (CORP) between a mobile host (MH) and a correspondent host (CH) while maintaining a QoS (Quality of Service) therebetween, which requires few updates in the current Internet architecture.

In accordance with the present invention, there is provided a method, for use in wireless Internet, which extends an established resource reservation path between a mobile host (MH) and a correspondent host (CH), the MH moving across cells each having a base station (BS) therein and the established resource reservation path being made between the MH and the CH through an initial BS located in an initial cell where the MH is currently located, the method including the steps of:

(a) establishing pseudo reservation paths (PRPs) between the initial BS and its neighboring BSs, one PRP being established between the initial BS and each of the neighboring BSs;

(b) once the MH moves into one of the neighboring cells of the initial cell, activating a PRP (pseudo reservation path) established for a neighbor BS, the neighbor BS being located in said one of the neighboring cells, and concatenating the activated PRP with the established resource reservation path to thereby establish a concatenated path between the MH and the CH through the initial BS and the neighbor BS; and (c) establishing the optimized resource reservation path.

BRIEF DESCRIPTION OF THE DRAWINGS

The objects and features of the present invention will become apparent from the following description of the present invention given in conjunction with the accompanying drawings, in which.

DETAILED DESCRIPTION OF THE PREFERRED EMBODIMENTS

The present invention is carried out by using a scheme of CORP (Concatenating and optimizing Resource Reservation Path). The CORP is built on RSVP (Resource Reservation Setup Protocol) and has three key features of: pre-establishment of PRPs (Pseudo Reservation Paths); activation of a PRP and CRP (Concatenation of Resource Reservation Path) to extend the reservation path by concatenating the activated PRP with an existing RSVP session; and ORP (optimization for Resource Reservation Path).

In CRP, each BS (base station) takes charge of the RSVP process and also supports mobility of MHs (Mobile Hosts). To support MH's movements including those that cross routing domains, a special RSVP session, called a pseudo reservation, in place of the passive reservation of Talukdar, supra, is employed in accordance with the present invention. A pseudo reservation session is established in the same way as a normal RSVP session but no traffic is delivered over the session until a sender activates it. It looks like a passive reservation but there is an important difference: namely, the routers in networks do not need to know whether a RSVP session is a pseudo reservation or not. In the present invention, pseudo reservations are established between BSs. Only the BSs need to know about their existence and block traffic on them before the pseudo reservation paths are activated. On the other hand, a passive reservation must be recognized by all routers along its path and treated in a different manner from a normal RSVP session. Because of the transparency of pseudo reservations of the present invention, they can be applied to handoffs between two routing domains without any functional change in the routers.

In CRP, BSs pre-establish pseudo reservations with neighboring BSs. If a MH moves to another cell, the PRP between the current cell and the previous cell is activated and traffic is delivered through the activated PRP. The previous BS concatenates the original RSVP path with the activated PRP and forwards traffic on it.

The major features of a network architecture needed to support CRP are follows:

Each cell in the mobile network has a BS which is a mobile Access Point (AP) with certain intelligence.

Every BS knows about their neighboring BSs including their IP addresses.

Each BS has capability to establish a pseudo reservation and to activate it when needed.

Each BS can forward traffic from one reservation path to another.

Figure 1:
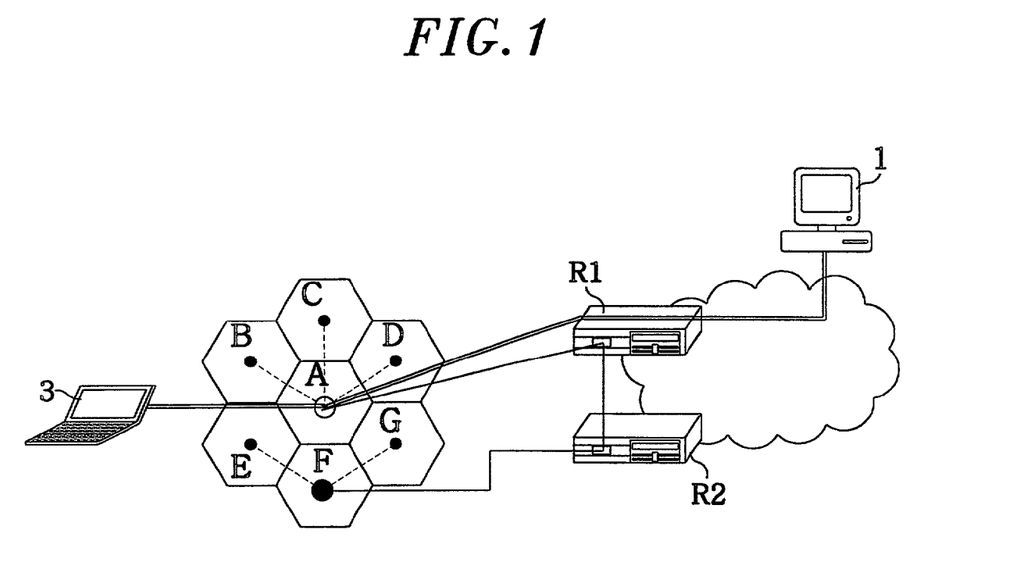
FIG. 1 shows a network architecture for CRP (Concatenation of Resource Reservation Path)

Referring to FIG. 1, there is illustrated an exemplary pseudo reservation process. MH 3 participates in a RSVP session established between itself and a correspondent host (CH) 1, which is illustrated with a double line. The current BS of MH 3 is BS_A. A hexagon represents a wireless cell served by a BS located therein. It is assumed that BSs BS_A, BS_B, BS_C and BS_D belong to a single routing domain with a gateway router R1 and BSs BS_E, BS_F and BS_G belong to another routing domain which is served by a gateway router R2. A dotted line represents a PRP within a routing domain and a solid line represents a PRP between two neighboring routing domains.

As shown in FIG. 1, when MH 3 participating in the RSVP session enters cell A or when MH 3 in cell A requests a new RSVP session, BS_A establishes pseudo reservations between itself and its neighboring BSs BS_B, BS_C, BS_D in the same routing domain and BS_F in a neighboring routing domain. Pseudo reservations between the current BS BS_A and its neighboring BSs BS_B, BS_C, BS_D in the same routing domain are established directly, whereas a pseudo reservation between the current BS BS_A and the BS_F in the neighboring routing domain is established through routers R1 and R2. Contrary to a passive reservation, routers R1 and R2 do not have to know whether a reservation session between BS_A and BS_F is pseudo or not. The pseudo reservation between BS_A and BS_F is treated as if it is an ordinary RSVP session. BS_F is a representative of the neighboring BSs residing in another routing domain, i.e., BS_E and BS_G. Because an inter-routing-domain PRP, which is a PRP established between two different routing domains, consumes more network resources than a PRP within a same routing domain, only one inter-routing-domain PRP, e.g., between BS_A and BS_F, is established between two neighboring routing domains as shown in FIG. 1. BS_F shown in FIG. 1 then establishes pseudo reservations between itself and the BSs BS_E and BS_G, which neighbor with the current BS BS_A, in the same routing domain on behalf of BS_A. The choice of the representative is arbitrary and can be predetermined for each BS along the boundary between two neighboring routing domains.

If MH 3 moves from cell A to cell B, C, D or F, the PRP between the new BS and the previous BS, BS_A, is activated. Then BS_A forwards traffic between the activated PRP and the existing reservation path. If MH 3 moves to cell E, a PRP between BS_E and BS_F and a PRP between BS_F and BS_A are activated. The reservation path is extended to BS_E via BS_F. In this case, not only BS_A but also BS_F forwards traffic between three reservation paths, i.e., the existing reservation path and two activated PRPs.

Figure 2:
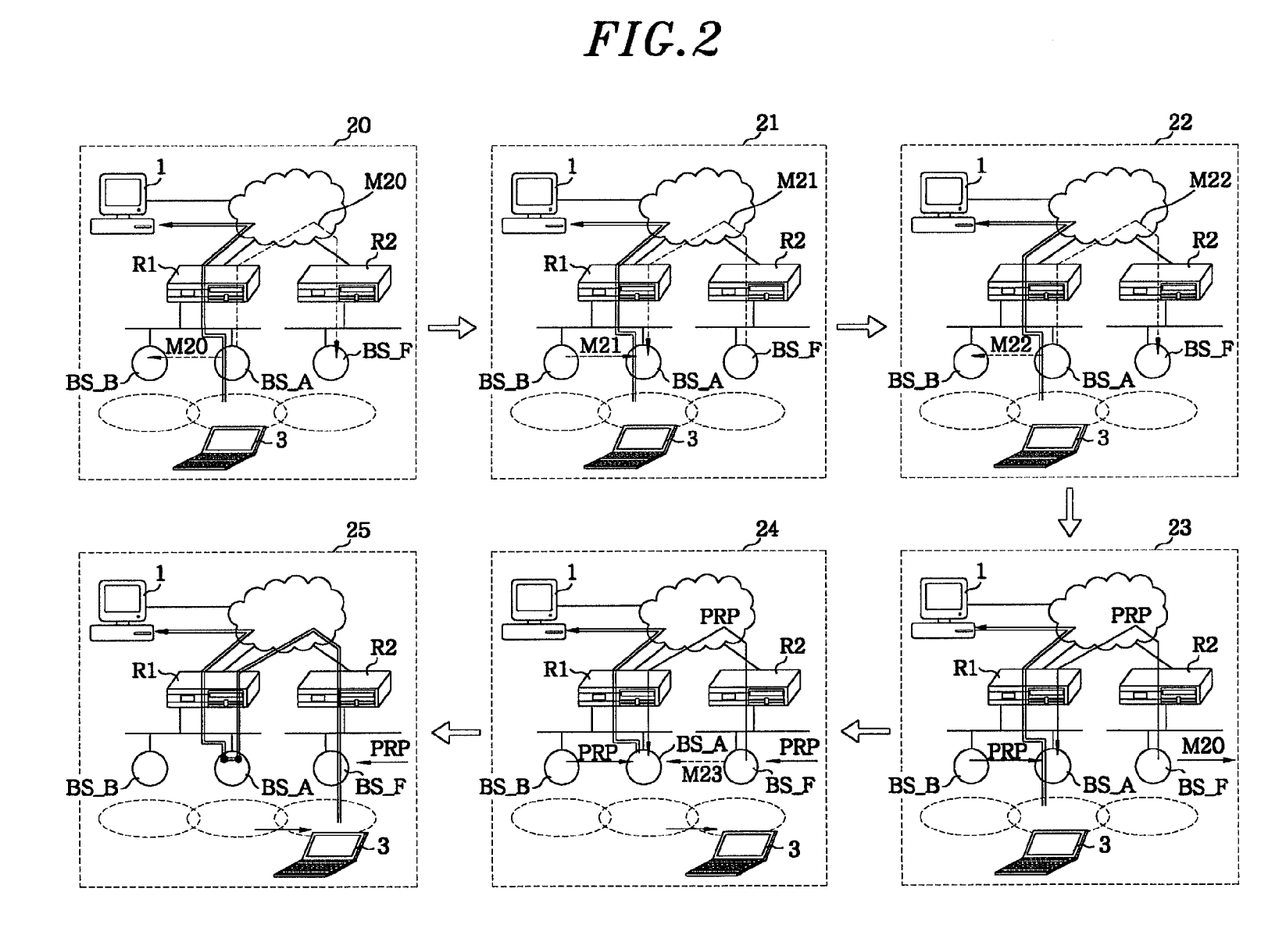
FIG. 2 depicts a CRP process when a MH is a sender in RSVP session.

FIG. 2 shows a process of establishing pseudo reservations when MH 3 is a sender in a RSVP session established between MH 3 and CH 1. A double line represents an ordinary RSVP path or an activated PRP and dotted lines represent a control message flow for the RSVP and CRP processes. Each solid line represents a PRP between two BSs. The detailed procedure of CRP will now be explained hereinafter.

At step S20, MH 3 currently resides in cell A and participates in a RSVP session as a sender. The current BS is BS_A. First, BS_A passes CRP inform messages M20, which notify the MH 3's entrance or establishment of a new RSVP session, to each of its neighboring BSs in a same routing domain, e.g., BS_B, and a representative BS in a neighboring routing domain, e.g., BS_F. In this example, it is assumed that BS_A and BS_B are in the same routing domain while BS_F resides in a neighboring routing domain as shown in FIG. 1. The inform message M20 delivered to BS_B includes Tspec, which defines the traffic characteristics of the data flow that MH 3 will generate. The inform message M20 delivered to BS_F includes not only Tspec but also IP addresses of BS_A's neighboring BSs in the neighboring routing domain in which BS_F resides.

At step S21, when each of BS_B and BS_F receives the inform message M20, it sends a RSVP path message M21 to BS_A in order to establish a PRP from itself to BS_A, wherein this RSVP path message M21 includes Tspec.

At step S22, BS_A sends a RSVP resv message M22 to each of BS_B and BS_F in response to the RSVP path message M21 therefrom. Then at step S23, PRPs between BS_A and BS_B, BS_F are established. BS_F plays the role of BS_A in steps S20 to S22 as the representative of neighboring BSs (not shown) of BS_A in the neighboring routing domain.

At step S24, if MH 3 moves into the cell F, in which BS_F resides, BS_F sends a CRP activate message M23 to BS_A to notify this movement and activates the PRP between BS_A and itself. Then traffic generated by MH 3 is forwarded to the activated PRP by BS_F, which in turn is forwarded to the original RSVP session by BS_A.

Since it is not necessary to maintain the PRP between BS_A and BS_B any more, BS_A terminates the PRP between BS_B and itself at step S25. Finally, BS_F plays the role of BS_A performed at steps S20 to S23 to prepare for future movement of MH 3.

Figure 3:
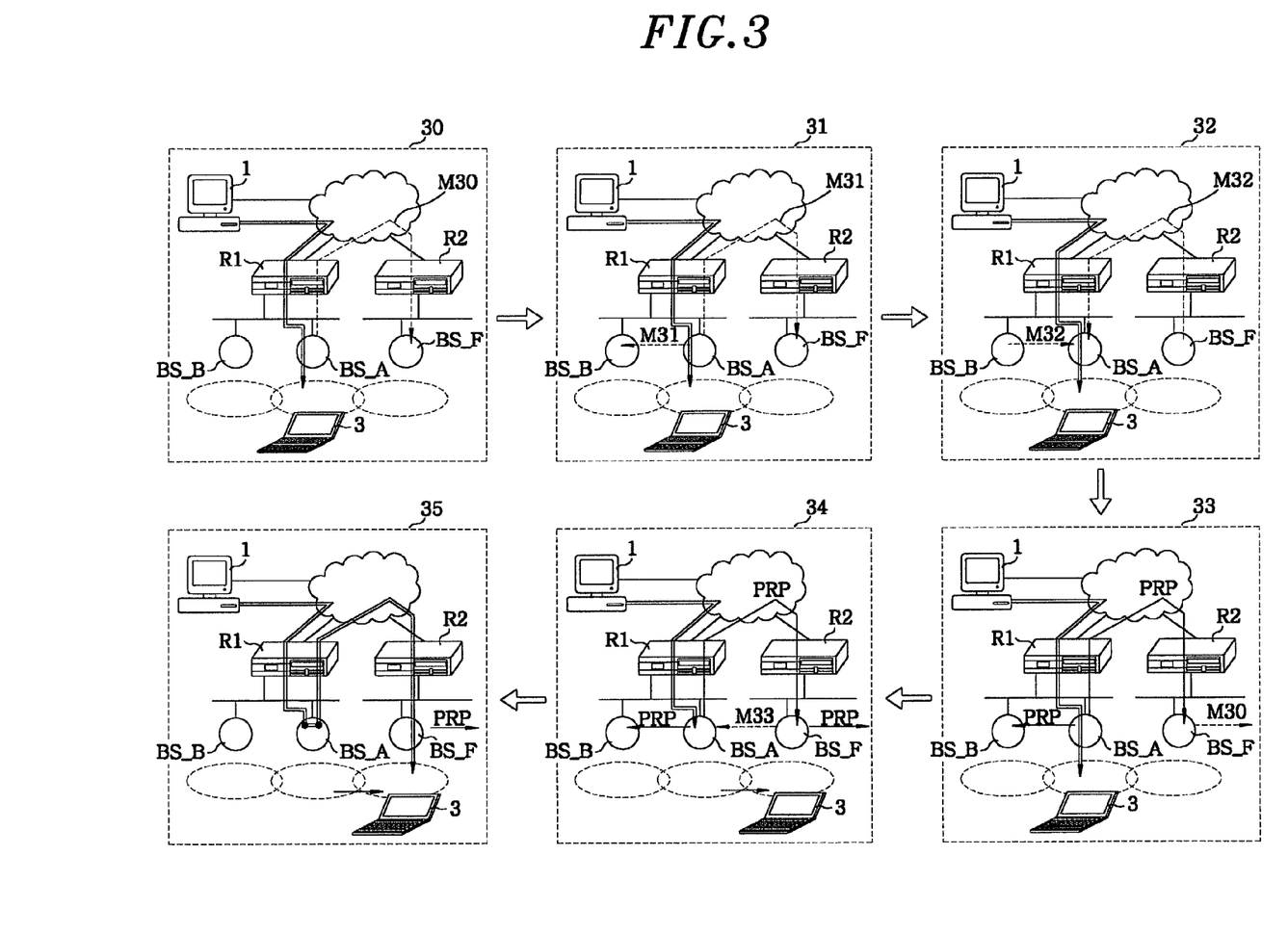
FIG. 3 represents a CRP process when a MH is a receiver in RSVP session.

Referring to FIG. 3, there is shown a process of establishing pseudo reservations when MH 3 is a receiver. This process is similar to the one described with respect to FIG. 2 where MH 3 is a sender, but there are some minor differences because RSVP is a receiver-initiated setup protocol. The process can be described as follows.

At step S30, if MH 3, which is participating in a RSVP session, moves into the cell A or if a new RSVP session is established for MH 3, BS_A sends a CRP inform message M30, which notify the MH3's entrance or establishment of the new RSVP session, to the representative BS in its neighboring routing domain, i.e., BS_F. Contrary to the case where MH 3 is a sender, the CRP inform message M30 does not include Tspec. The inform message M30 delivered to BS_F includes IP addresses of BS_A's neighboring BSs in the neighboring routing domain in which BS_F resides.

Subsequently, at step S31, BS_A sends RSVP path messages M31 to each of its neighboring BSs, i.e., BS_B and BS_F in order to establish a PRP from itself to BS_B and BS_F.

At step S32, each of the neighboring BSs BS_B and BS_F sends a RSVP resv message M32 to BS_A in response to the RSVP path message M31 and the PRPs between BS_A and BS_B, BS_F are established at step S33. BS_F establishes PRPs to BS_A's neighbors residing in BS_F's routing domain. BS_F acts as the representative of neighboring BSs (not shown) of BS_A in its routing domain.

At step S34, if MH 3 moves into the cell F, in which BS_F resides, BS_F sends a CRP activate message M33 to BS_A to notify this movement and activates the PRP between BS_A and itself.

Since it is not necessary to maintain the PRP between BS_A and BS_B any more, BS_A terminates the PRP between BS_B and itself at step S35. Finally, BS_F plays the role of BS_A in the steps S30 to S33 to prepare for future movement of MH 3.

The CRP scheme described above for establishing and activating one or more PRPs maintains a reservation path when MH moves in the wireless network. The mechanism supports inter-routing-domain handoffs and requires little change to the existing Internet. However, this mechanism alone does not solve the infinite reservation path extension problem.

Specifically, CRP mechanism is built on RSVP and uses a path extension technique to guarantee seamless QoS in mobile Internet. In the mechanism, in order to support seamless QoS, each BS related to MH's movement extends a reservation path by activating a prepared PRP and forwarding traffic between an existing reservation path and the extended one.

One problem in this mechanism, called as infinite reservation path extension, is that a reservation path can be extended infinitely if a MH moves continuously in the wireless networks. Mahadevan introduced the concept of QoS domain to avoid such problem (see I. Mahadevan et al., "An Architecture for QoS Guarantees and Routing in Wireless/Mobile Networks", ACM International Workshop on Wireless Mobile Multimedia (WOWMOM '98), pp. 11–20, 1998). A QoS domain is a group which is administratively composed of some adjacent cells. In this mechanism, an optimized sub-path is made between a gateway and a current BS in order to avoid infinite extension of a reservation path when MH moves from a QoS domain to another. However, this solution cannot cover a case where MH moves continuously within one QoS domain. In this case, there still exist an infinite reservation path extension problem and a reservation path loop problem. To solve the problems, the inventors of the present invention propose a new solution, i.e., Optimization for Reservation Path (ORP) mechanism. In this mechanism, the current BS of MH optimizes an extended reservation path between a sender and a receiver when the cost of maintaining an extended reservation path is higher than the cost of optimizing the extended reservation path. But there should be two major points to consider for adopting this mechanism. The first issue is when the optimization process should be performed. If a reservation path is extended using inter-routing-domain PRP or includes a loop, the reservation path strongly needs to be optimized. It also needs to perform an optimization process if it is more efficient to optimize an extended path rather than to use it continuously. Thus a way of determining cost in each case should be studied. The second issue is to minimize the cost required to carry out the optimization process. If a new RSVP session should be established for optimizing an existing reservation path, two RSVP sessions for one flow incur waste of network resources. Also, a new reservation request for optimization can be rejected by intermediate routers.

ORP always makes use of multicast address for every RSVP session, even though it is a one-to-one flow. Optimization is performed by joining in the multicast RSVP session instead of making a new RSVP session. This can considerably reduce consuming network resources.

Figure 4:
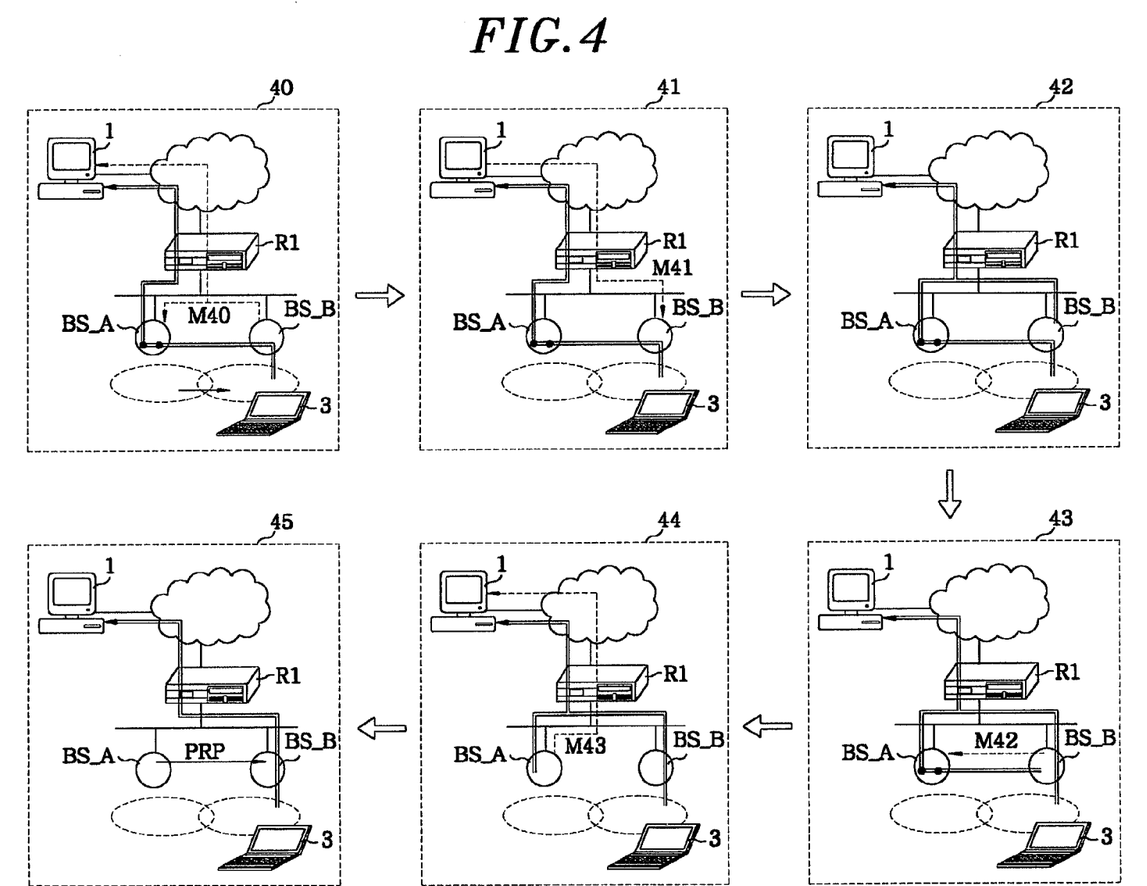
FIG. 4 illustrates an ORP (Optimization of Resource Reservation Path) process when a MH is a sender.

FIG. 4 shows an ORP process when MH 3 is a sender, wherein a double line represents an ordinary RSVP path or an activated PRP and a dotted line represents a control message flow for RSVP and ORP processes. To simplify the architecture, FIG. 4 describes a case where path extension is achieved using a PRP within one routing domain, but it can be applied directly to a case of using an inter-routing-domain PRP. In FIG. 4, it is assumed that a RSVP session with multicast address had been established between BS_A and CH 1 and then a CRP process has completed to support MH 3's movement in a similar fashion as in FIG. 2. A detailed process of ORP is as follow.

At step S40, BS_B sends a RSVP path message M40 destined to a multicast address of an existing RSVP session in order to join in the session. This message M40 is delivered to CH 1 and BS_A. BS_A discards the message M40 because it knows that BS_B resides in the extended path. Contrary to BS_A, CH 1 does not know the fact, so it replies to the RSVP path message M40 with a RSVP resv message M41 at step S41. This makes BS_B join in the existing RSVP session not via BS_A but directly through R1 at step S42.

At step S43, BS_B sends traffic from MH 3 to CH 1 through a new RSVP path. BS_B terminates the activated PRP between BS_A and itself by sending a CRP release message M42 to BS_A. Then BS_A leaves the multicast group by sending a RSVP path teardown message M43 to CH 1 (step S44). Finally, the existing reservation path from BS_A to CH 1 is terminated and only an optimized path between BS_B and CH 1 is left (step S45).

Figure 5:
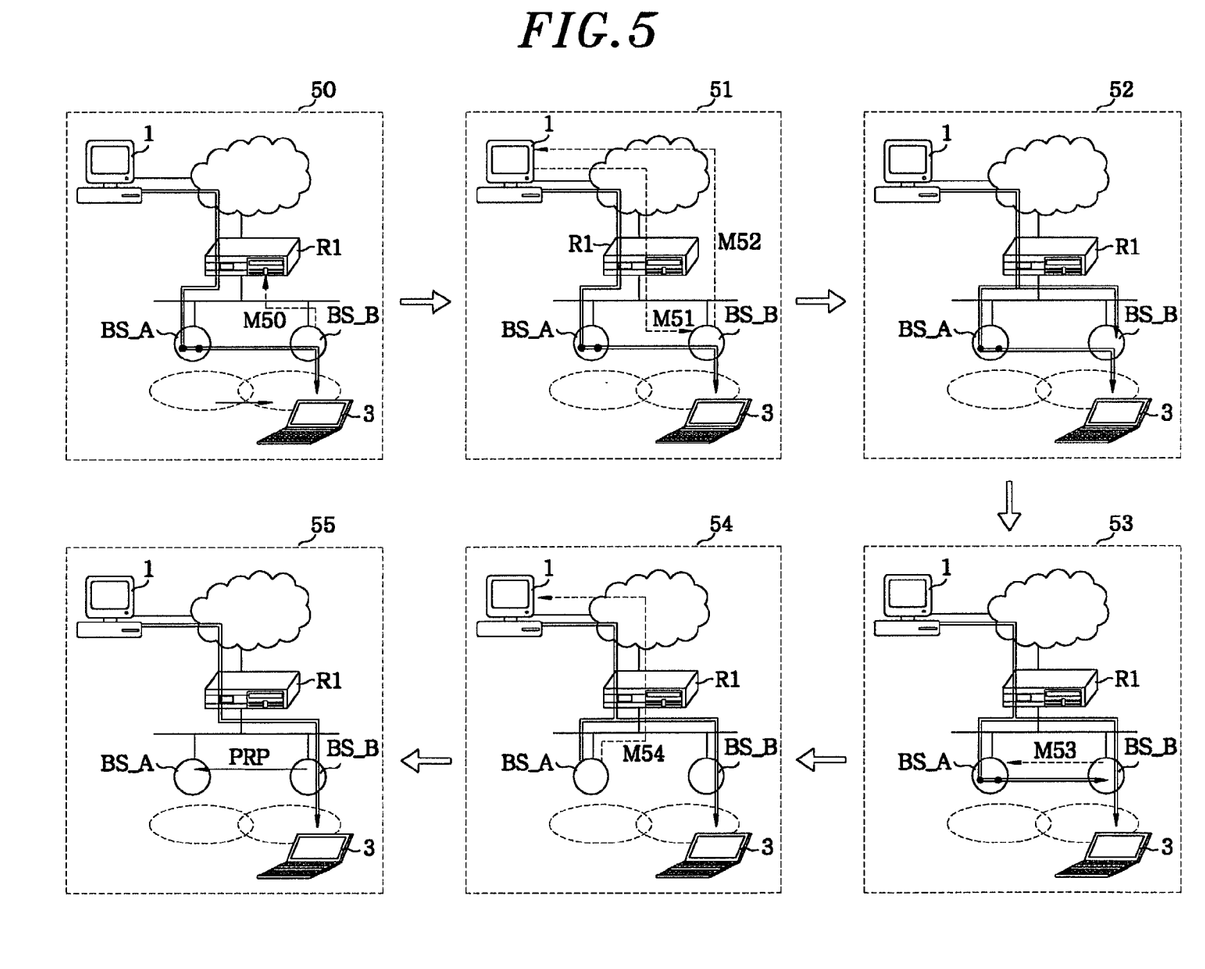
FIG. 5 offers an ORP process when a MH is a receiver.

Referring to FIG. 5, there is shown an ORP process when MH 3 participates in a RSVP session as a receiver. It is also assumed that a RSVP session with multicast address had been established between BS_A and CH 1 and then a CRP process has completed to support MH 3's movement in a similar manner as in FIG. 3. A detailed process is as follows.

At step S50, BS_B joins in the IP multicast group by sending Internet Group Management Protocol (IGMP) report message M50 to router R1 (for details of IGMP, see, e.g., W. Fenner, "Internet Group Management Protocol, Version 2", RFC 2236 on IETF, November 1997). Then BS_B waits for a RSVP path message M51 which CH 1 generates periodically through the IP multicast session. In this situation, BS_B can directly receive traffic from router R1 because it became a member of the IP multicast group by using the IGMP report message M50. But the directly delivered traffic cannot be served with a guaranteed service. To support seamless QoS to MH 3, BS_B should deliver traffic from the activated PRP to MH 3 and, at the same time, it should wait for the RSVP path message M51 delivered directly from CH 1.

CH 1 periodically sends the RSVP path message M51 destined to the multicast address in order to identify a flow for a new destination (see R. Branden supra). If BS_B receives the RSVP path message M51, it replies to the message M51 with a RSVP resv message M52 at step S51. This makes BS_B join in the multicast RSVP session as shown at step S52.

At step S53, BS_B sends a CRP release message M53 to BS_A to terminate the activated PRP between BS_A and itself and delivers traffic through the new reservation path to MH 3.

Then BS_A terminates the existing reservation path between CH 1 and itself by sending a RSVP path teardown message M54 to CH 1 (step S54) and leaving the multicast RSVP session.

Finally, only one optimized path between BS_B and CH 1 is left as shown in step S55.

The CORP scheme described above minimizes delays and overheads when MH, which participates in a RSVP session, moves continuously in wireless networks. The proposed mechanism supplements drawbacks of the existing approaches and provides the following advantages. First, the proposed mechanism supports inter-routing domain handoffs as well as handoffs within a routing domain. Second, the novel approach requires few functional and architectural changes to the existing network components. Third, the process and the network architecture that support QoS-guaranteed handoff are simple. In the proposed architecture, only BSs are required to have functions that support the proposed scheme because the BS takes care of every RSVP process and the additional functions to support mobility on behalf of a MH. Finally, it scarcely increases the scalability problem inherent in RSVP because most of PRPs would be established between two BSs in the same routing domain.

While the present invention has been described with respect to the particular embodiments, it will be apparent to those skilled in the art that various changes and modifications may be made without departing from the spirit and scope of the invention as defined in the following claims.

What is claimed is:

1. A method, for use in wireless Internet, which extends an established resource reservation path between a mobile host (MH) and a correspondent host (CH), the MH moving across cells, each of the cells having a base station (BS) therein and the established resource reservation path being made between the MH and the CH through an initial BS located in an initial cell where the MH is currently located, the method comprising the steps of:
    (a) establishing pseudo reservation paths (PRPs) between the initial BS and its neighboring BSs, one PRP being established between the initial BS and each of the neighboring BSs;
    (b) once the MH moves into one of the neighboring cells of the initial cell, activating a PRP established for a neighbor BS, the neighbor BS being located in said one of the neighboring cells, and concatenating the activated PRP with the established resource reservation path to thereby establish a concatenated path between the MH and the CH through the initial BS and the neighbor BS; and
    (c) establishing an optimized resource reservation path.

2. The method of claim 1, wherein no traffic is delivered through a PRP until concatenated.

3. The method of claim 1, wherein, when the MH is a sender, the step (a) includes the steps of:
    (a1) sending a CRP (Concatenation of Reservation Path) inform message from the initial BS to the neighboring BSs, the CRP inform message including Tspec which defines traffic characteristics of a data flow to be generated by the MH;
    (a2) delivering a RSVP path message from each of the neighboring BSs to the initial BS, the RSVP path message including the Tspec; and
    (a3) sending a RSVP resv message from the initial BS to each of the neighboring BSs, thereby establishing the PRPs.

4. The method of claim 1, wherein, when the MH is a receiver, the step (a) includes the steps of:
    (a4) delivering a RSVP (resource reservation setup protocol) path message from the initial BS to each of the neighboring BSs in order to establish the PRPs between the initial BS and the neighboring BSs; and
    (a5) sending a RSVP resv message from each of the neighboring BSs to the initial BS, thereby establishing the PRPs.

5. The method of claim 1, wherein the step (b) includes the steps of:
    (b1) sending a CRP activate message from the neighbor BS to the initial BS to activate the PRP established therebetween;
    (b2) concatenating the activated PRP with the established resource reservation path; and
    (b3) terminating the established PRPs excepting the activated PRP.

6. The method of claim 1, wherein, when the MH is a sender, the step (c) includes the steps of:
    (c1) sending a RSVP path message from the neighbor BS to the initial BS and the CH by using a multicast address of an existing RSVP session in order to make the neighbor BS join in the existing RSVP session;
    (c2) in response to the RSVP path message, sending a RSVP resv message from the CH to the neighbor BS, thereby making the neighbor BS join in the existing RSVP session not via the initial BS;
    (c3) delivering a CRP release message from the neighbor BS to the initial BS to terminate the activated PRP therebetween; and
    (c4) sending a RSVP path teardown message from the initial BS to the CH in order to terminate the established resource reservation path between the CH and the initial BS.

7. The method of claim 1, wherein, when the MH is a receiver, the step (c) includes the steps of:
    (c5) sending an IGMP (Internet Group Management Protocol) report message from the neighbor BS to a gateway router to make the neighbor BS join in an IP (Internet protocol) multicast group;
    (c6) directly delivering a RSVP path message from the CH to the neighbor BS, the RSVP path message identifying a flow for a new destination;
    (c7) in response to the RSVP path message, sending a RSVP resv message from the neighbor BS to the CH, thereby making the neighbor BS participate in an existing multicast RSVP session;
    (c8) delivering a ORP release message from the neighbor BS to the initial BS to terminate the activated PRP therebetween; and
    (c9) sending a RSVP path teardown message from the initial BS to the CH to terminate the established resource reservation path.

8. The method of claim 1, wherein the BS for each cell directly communicates with a gateway router connected thereto.

9. The method of claim 8, wherein the gateway router does not need to know whether a RSVP (resource reservation setup protocol) session is a pseudo reservation or not.

10. The method of claim 1, wherein only one inter-routing-domain PRP is established between two neighboring routing domains.

11. The method of claim 1, wherein the method is built on a RSVP.

12. The method of claim 1, wherein the method is applied within a routing domain.

13. The method of claim 12, wherein the method is further applied between two different routing domains.

14. The method of claim 1, wherein the BS for each cell carries out the method as an agent of the MH.

* * * * *